United States Patent [19]
Aines et al.

[11] Patent Number: 5,986,159
[45] Date of Patent: Nov. 16, 1999

[54] CHEMICAL TAILORING OF STEAM TO REMEDIATE UNDERGROUND MIXED WASTE CONTAMINENTS

[75] Inventors: Roger D. Aines, Livermore; Kent S. Udell, Berkeley; Carol J. Bruton, Livermore; Charles R. Carrigan, Tracy, all of Calif.

[73] Assignee: The Regents of the University of California, Oakland, Calif.

[21] Appl. No.: 08/931,425

[22] Filed: Sep. 16, 1997

[51] Int. Cl.⁶ .............................. E02D 31/00; B09B 5/00
[52] U.S. Cl. ........................... 588/19; 588/209; 588/213; 588/216; 588/220; 588/230; 405/131; 134/2
[58] Field of Search .............................. 588/19, 209, 213, 588/216, 220, 230; 405/131; 134/2

[56] References Cited

U.S. PATENT DOCUMENTS

| | | | |
|---|---|---|---|
| 5,245,113 | 9/1993 | Schulz | 134/19 |
| 5,564,861 | 10/1996 | Khudenko | 405/128 |
| 5,656,239 | 8/1997 | Stegemeier et al. | 422/32 |

Primary Examiner—Arun S. Phasge
Attorney, Agent, or Firm—L. E. Carnahan

[57] ABSTRACT

A method to simultaneously remediate mixed-waste underground contamination, such as organic liquids, metals, and radionuclides involves chemical tailoring of steam for underground injection. Gases or chemicals are injected into a high pressure steam flow being injected via one or more injection wells to contaminated soil located beyond a depth where excavation is possible. The injection of the steam with gases or chemicals mobilizes contaminants, such as metals and organics, as the steam pushes the waste through the ground toward an extraction well having subatmospheric pressure (vacuum). The steam and mobilized contaminants are drawn in a substantially horizontal direction to the extraction well and withdrawn to a treatment point above ground. The heat and boiling action of the front of the steam flow enhance the mobilizing effects of the chemical or gas additives. The method may also be utilized for immobilization of metals by using an additive in the steam which causes precipitation of the metals into clusters large enough to limit their future migration, while removing any organic contaminants.

20 Claims, 2 Drawing Sheets

CHEMICAL TAILORING OF STEAM TO REMEDIATE UNDERGROUND MIXED WASTE CONTAMINENTS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to removal of underground contamination, particularly to a method of insitu decontamination using steam injection, and more particularly to a method of chemically tailoring of the steam for in situ underground mixed-waste remediation.

Cleanup of underground contamination by organics, metals, radionuclides, etc. has been a major concern, especially where the contaminated areas are located adjacent to underground water. Various approaches have been utilized to eliminate the soil contamination, often caused by leakage of fuel or oil tanks, industrial wastes, etc. These prior approaches have included physical removal (excavation) of the contaminated soil, as well as methods to flush contaminants from the soil. In many contaminated areas the contaminants are beyond the depth where excavation is possible, and fluid and steam injection used alone or coupled with soil heating has been utilized to remove the contaminants. One of the more recent approaches to solving this problem is a steam injection/subatmospheric pressure removal system disclosed in U.S. Pat. No. 5,018,576 issued May 28, 1991 to K. S. Udell et al. for the rapid cleanup of underground organics.

However, many of the contaminated areas or spills also contain mixed-waste, i.e., metals, radionuclides and organics. There is no known prior method to clean such spills or contaminated areas if they are beyond the depth where excavation is possible.

This problem is solved by the present invention which involves the simultaneous remediation of underground contamination by mixed-waste composed of organic materials and metals or radionuclides. The method of this invention utilizes steam injection in combination with injection of gases or chemicals which mobilize the mixed-waste as steam pushes the waste through the ground toward an extraction well where the waste is withdrawn by subatmospheric pressure, or immobilize waste such as metals into large clusters to prevent migration.

SUMMARY OF THE INVENTION

It is an object of the present invention to remediate mixed-waste underground contamination.

A further object of the invention is to provide a method for remediating underground contamination using injection of steam containing gases or chemicals which mobilize or immobilize the contaminants.

A further object of the invention involves chemical tailoring of steam for in situ underground mixed-waste remediation.

Another object of the invention is to provide a method for in situ decontamination of a contaminated subsurface area containing mixed-waste.

Another object of the invention is to provide a method to simultaneously remediate underground contamination composed of organics and metals or radionuclides by chemically tailored steam injection which moves the organics toward an extraction well and either mobilizes or immobilizes any metals or radionuclides, to remove same or prevent same from future migration through the soil.

Another object of the invention is to provide a method for underground mixed-waste remediation using chemically tailored injected steam in a system having one or more injection wells and an extraction well under subatmospheric pressure for mobilizing and/or immobilizing certain of the mixed-waste contaminants.

Other objects and advantages of the present invention will become apparent from the following description and accompanying drawings. Basically, the invention involves chemically tailoring of steam for in situ underground mixed-waste remediation. Mixed-waste (organics and metals or radionuclides) can be simultaneously removed from underground contaminated areas by injecting chemically tailored steam through one or more injection wells wherein added chemicals or gases cause mobilization of the contaminants as the steam pushes the contaminants through the ground toward an extraction well. The heat and boiling action of the front of the tailored steam flow enhance the mobilizing effects of the additives (chemicals or gases). Thus, both organics and metals or radionuclides can be simultaneously removed. Also, by tailoring the injection steam with selected chemicals/gases the chemistry of the condensate zone can be adjusted to precipitate the metals or radionuclides into large-enough clusters as to limit future migration, whereby the organics are removed while the metals stay in place. Thus, the present invention can be utilized for essentially any mixed-waste cleanup operations, such as organics and plutonium, or organics and chromium, for example.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
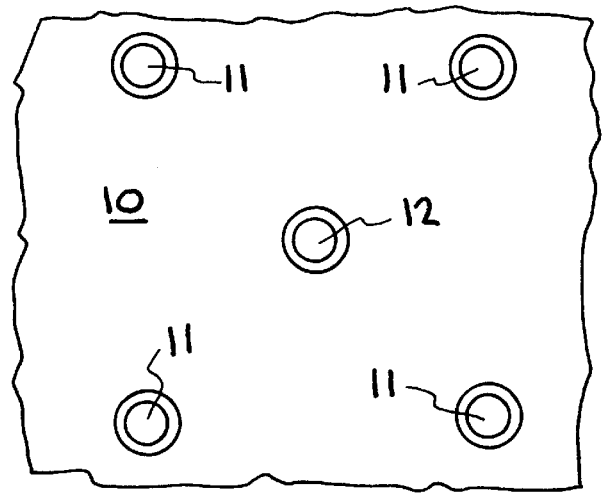
FIG. 1 schematically illustrates a cleanup area for underground contamination using a plurality of injection wells and a centrally located extraction well.

The present invention is directed to a method for in situ decontamination of underground mixed-waste. The method involves chemically tailoring of steam injected underground which mobilizes any organic waste and either mobilizes or immobilizes wastes such as metal or radionuclides. The chemically tailored steam pushes the mobilized waste through the ground toward a subatmospheric pressure extraction well where the waste is removed. The heat and boiling action of the steam front enhance the mobilizing effects of the additives, which may be chemicals or gases. By controlling the composition of the chemistry of the steam entering the underground condensate zone, the tailored steam can be adjusted to precipitate the metal wastes, for example, into large enough clusters to limit their future migration. In such application of this method, the organics are removed but the metals stay in place. With respect to underground mixed-wastes, including metals for example, the injected steam may be chemically tailored to mobilize or immobilize the metals, while simultaneously the organics of the mixed-waste are mobilized for removal through an extraction well using subatmospheric pressure as known in the art, whereafter the extracted mixed-waste is appropriately treated depending on the composition thereof.

The present invention in effect constitutes an improvement over the process for in situ decontamination of subsurface soil and ground water described in above-referenced U.S. Pat. No. 5,018,576 which utilizes steam injection for rapid cleanup of underground organics. By chemically tailoring the steam, such as injected by the process of U.S. Pat. No. 5,018,576, areas contaminated by mixed-wastes (organics and metals or radionuclides) can be decontaminated. The steam injection approach to remove organics of U.S. Pat. No. 5,018,576 and the chemically tailored steam injection approach of the present invention differ from previous soil-washing efforts in using steam as the active medium and working in situ. Like the approach of the above referenced patent, the method of the present invention may utilize an extraction well to which is applied subatmospheric pressure whereby the tailored steam injected via one or more injection wells is pushed and drawn in a substantially horizontal direction through the contaminated subsurface area to mobilize the mixed-wastes, or mobilize any organics in the mixed-waste while immobilizing any metals, for example, in the mixed-waste. Thus, the method of this invention can be effectively utilized for mixed-waste cleanup, such as in Government sites containing organics and plutonium, or similarly, in common industrial organic/metal contaminant cleanup sites or spills containing organics and chromium.

The invention, as described in greater detail hereinafter has two components, modes, or approaches for metal decontamination: 1) mobilization of metals, and 2) immobilization of metals. Either mode can be carried out simultaneously with decontamination of organics in the same area of underground contamination. In both modes a chemical or gas is added to saturated steam via high-pressure injection of a gas, such as $H_2$ or $CO_2$, or a chemical, such as HCl, NaOH, or Ethylene Diamine Tetracetic Acid (EDTA), in droplets formed by an atomizer, into the steam flow. The thus tailored steam is injected into the ground where it sweeps organic contamination toward an extraction well while treating the associated metals, radionuclides, etc. Repeated sweeps may be required in some contaminated areas.

For mobilization of any metal waste, for example, the chemistry of the steam-condensate (additives) is adjusted so as to solubilize the metal(s) of interest by means such as changing the Eh or pH or adding liquids such as citrate, amides, halides, carboxylic acids, crown ethers, and EDTA. The boiling condensate zone advances toward the extraction well, sweeping the metals along with it.

For immobilization of any metal waste, for example, the chemistry of the steam-condensate is adjusted to precipitate the metals in the condensate zone into clusters large enough as to limit their future migration. The organics are simultaneously removed while the metals stay in place. The condensate zone advances toward the extraction well, sweeping the organics along but leaving dusters of metal along the way.

Referring now to the drawings, FIG. 1 illustrates a cleanup site 10 within which four injection wells 11 and one extraction well 12 are located. For example, the injection wells 11 may be located a distance of 1 to 30 m from the extraction well 12 and located from one another a distance such as to enable sweeping of the area by the chemically tailored injection steam. The composition of the soil, the configuration and size of the site 10, and the type of underground contamination, among other considerations are utilized to determine the number and location of the injection wells and the location of the extraction well. At some sites the differing composition of the soil in various areas will determine the location of each injection well with respect to a common extraction well. The injection and extraction wells are generally of the same depth, which depending on the site, soil, and contamination may vary from 5 to >100 feet into the ground.

Figure 2:
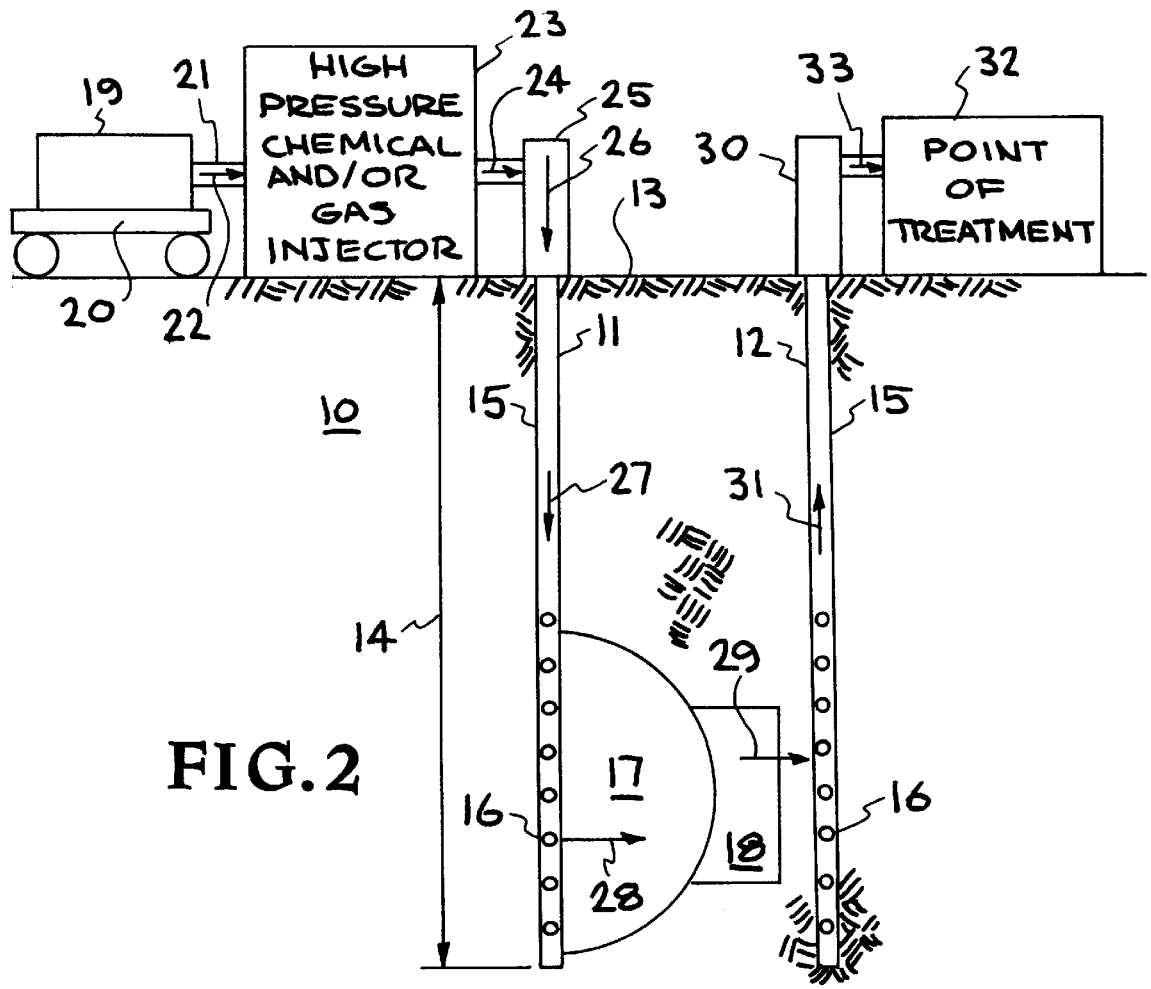
FIG. 2 schematically illustrates with chemically tailored steam in situ underground mixed-waste remediation in accordance with the present invention.

FIG. 2 schematically illustrates the method of the present invention utilizing the mobilization mode or approach via a single injection well 11 and an extraction well 12 which extend downwardly from ground surface 13 of cleanup site 10 to any desired depth as indicated by the double arrow 14. The wells 11 and 12 include an upper cased section 15 and a lower open section 16, with a steam or condensate zone 17 located at the lower end of section 16 of injection well 11 and which extends across an area 18 of contaminated soil located between wells 11 and 12.

A boiler 19 located on a trailer 20 generates saturated steam contained in a pipe 21 which is directed, as indicated by steam flow arrow 22, through a high pressure chemical and/or gas injector 23 whereby either steam, gas and chemical or unsaturated steam and gas with a chemical in entrained droplets (referred to hereinafter as steam-additive) exit injector 23 as indicated by steam-additive arrow 24. The steam-additive 24 exiting injector 23 is directed into an injector housing 25 of injection well 11 as indicated by arrow 26 for pressurizing the steam-additive 24, whereafter the steam-additive flows under pressure downwardly through section 15 of injection well 11 as indicated by arrow 27 and into section 16 of well 11 wherein it passes into steam or condensation zone 17 as indicated by arrow 28. Steam or condensation zone 17 includes a front indicated at arrow 29 wherein heat and boiling action enhance mobilizing effects of the chemical additives in the steam flow, whereby the mixed-waste contaminants (organic and metals, for example) in contaminated soil 18 are mobilized and pushed toward the lower section 16 of extraction well 12 as indicated by arrow 29. Extraction well 12 is under subatmospheric pressure, such as created by a vacuum pump 30 located on ground surface 13, whereby the steam and mobilized mixed-waste is drawn in a substantially horizontal direction through the contaminated soil 18 and water, organic contaminants and metals are drawn upwardly through sections 16-15 of extraction well 12 as indicated by arrow 31, through vacuum pump 30, to a point of treatment 32 as indicated by arrow 33. The method produces simultaneous decontamination of the underground soil of both organics and metals, for example.

FIG. 2 has been described using the mobilization mode or approach of the invention. The operation of the FIG. 2 arrangement for the immobilization mode for metal decontamination, for example, differs in that the steam-additive 24 is composed so as to precipitate the metals into clusters large enough to limit their future migration instead of solubilizing the metals as in the mobilization mode. In the immobilization mode, steam and additives along the front 29 of condensation or steam zone 17 mobilize any organic contaminants in contaminated soil 18 and move such toward the extraction well 12 as described above, while leaving the metal clusters in place in the soil 18. Thus, this method produces simultaneous organic and metal decontamination of underground soil.

The following are examples of the method of the present invention for simultaneous decontamination of organics and metals, utilizing metal mobilization and immobilization modes:

EXAMPLE I

Utilizing the arrangement of FIG. 2, with the soil 18 contaminated with an organic TCA (trichloroethane) and a metal (plutonium), the metal mobilization mode is carried out by:

1. Passing saturated steam from boiler 19 in an amount of 500 to 50,000 lbs./hr. into the gas/chemical injector 23.

2. Injecting water containing EDTA into the saturated steam as it passes through injector 23, to produce a steam-additive 24 having 99.5 percent steam and 0.5 percent EDTA.

3. As the steam-additive passes through the injector housing 25 it is pressurized to a range of 10 to 150 psi, and passes down injection well 11 into the condensation or steam zone 17, where it spreads to cover an area of 9 sq. ft./400 lbs. steam injected for passage through the contaminated soil 18 towards the extraction well at the rate of about 2 to 20 ft./day.

4. The extraction well 12 is pumped down by vacuum pump 30, or other suitable mechanism, to a subatmospheric pressure of 100 to 400 Torr.

5. The material (water, organic contaminant, and metal) passing up the extraction well 12 for treatment indicated at point 32 includes 1 to 100 parts per million (ppm) of TCA, (organic), and 0.01 to 1 ppm plutonium (metal) in about 50 gallons of water per 400 lbs. steam injected. It is recognized that a percentage of the liquid (condensed steam) will remain as moisture in the soil 18 of the contaminated cleanup site 10, and thus the amount of liquid (water) extracted will vary depending on various parameters including soil composition, time passing from injection well to extraction well, etc.

6. Ceasing injection of the steam-additive and extracting any remaining water and contaminants.

EXAMPLE II

Utilizing the arrangement of FIG. 2, with the soil 18 contaminated with an organic (TCE) and a metal (chromium $Cr^{6+}$), the metal immobilization mode is carried out by:

1. Passing saturated steam from boiler 19 in an amount of 500 to 50,000 lbs./hr. into gas/chemical injector 23.

2. Injecting hydrogen gas ($H_2$) into the saturated steam as it passes through injector 23 to produce a steam-additive 24 having 100 ppm $H_2$ by wt. (additive). The steam-additive 24 includes $H_2$ to immobilize the metal.

3. Passing the steam-additive 24 through the injector housing 25 to pressurize it to a range of 10 to 100 psi, and passing it down the injection well 11 to the condensation or steam zone 17 where it spreads to cover an area of about 9 sq. ft. per 400 lbs steam injected.

4. Producing a subatmosphere in the range of 100 to 300 Torr by the vacuum pump 30 or other means.

5. Immobilizing the metal (chromium) in the contaminated soil 18 by precipitation, due to the $H_2$ added to the steam, into clusters of $Cr^{3+}$ which are large enough to limit future migration in the soil 18.

6. Extracting water and mobilized organic contaminant for treatment wherein there is 1 to 100 ppm of TCE (organic) and about 80 gal. water/400 lbs. steam. As pointed out in Example I, there will be water lossage as it passes the soil 18.

7. Ceasing injection of the steam-additive and extracting any remaining water and/or contaminant.

Currently, there are various organic materials such as benzene, toluene, cutting oil, and solvents such as TCE or TCA that have contaminated soils, particularly around aircraft or vehicle fueling areas, as well as from used oil dumps. In addition to plutonium and chromium, other metals such as nickel or lead have been found to produce soil contamination, particularly when located near a water supply. Radionuclides, such as TC, V and Pu are known as soil and underground water contaminants that need be removed. All of these contamination materials and mixtures thereof can be removed by chemically tailoring steam for in situ underground remediation in accordance with the present invention, either by mobilization or immobilization of the metals or radionuclides simultaneously with mobilization of the organic contaminants.

Metals which are mobilized in an oxidized state, such as chromium or technetium, are most easily immobilized using a reducing gas, preferably hydrogen ($H_2$) or carbon monoxide (CO). Other metals are most soluble in reduced form, such as manganese, are most easily immobilized using oxygen ($O_2$) gas. These are the preferred methods for immobilizing metals since the $H_2$ or $O_2$ react to form ions ($H^+$ or $OH^-$) that are already present in ground water.

Figure 3A:
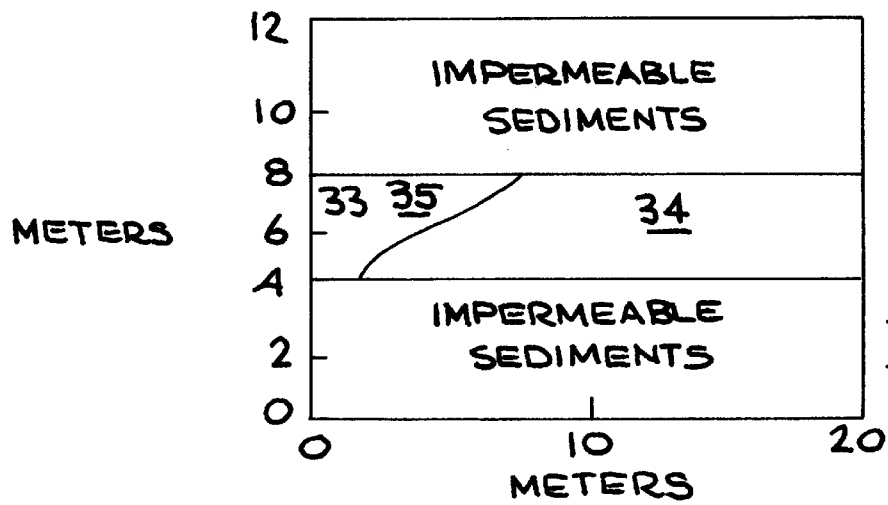
FIGS. 3A–C illustrate the results of finite element simulation of the process of injecting gas along with steam.
Figure 3B:
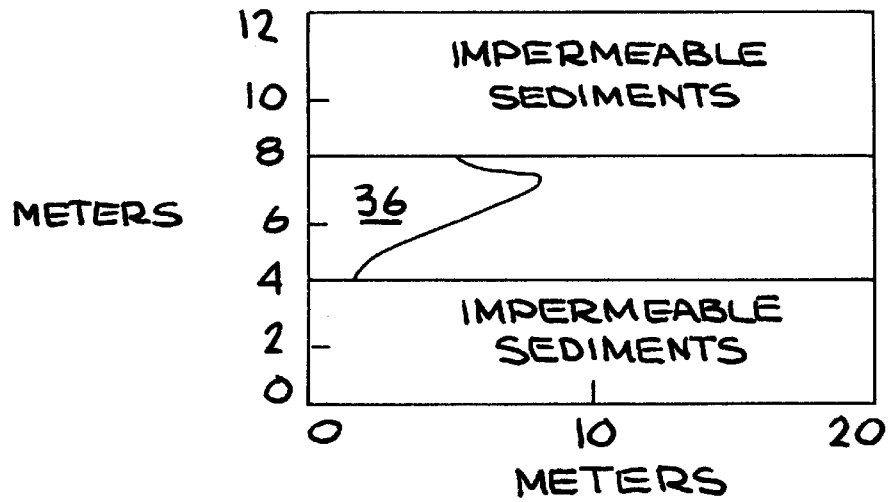
Figure 3C:
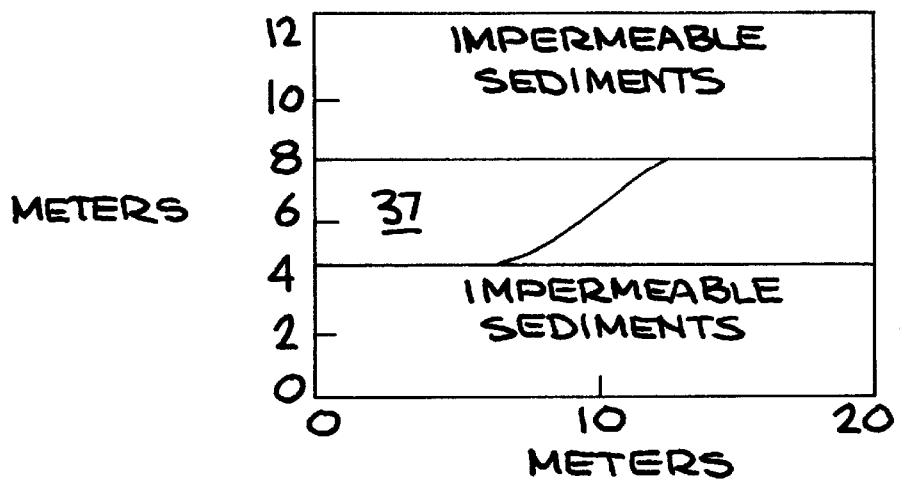

FIGS. 3A–C show the results of finite-element simulation of the process of injecting gas along with steam. These simulations show that there is sufficient gas mixing with contaminated fluid (instead of displacing the contaminated fluid with steam condensate) and that the oxidation or reduction of metal contaminants can proceed in the contaminated fluids. FIG. 3A shows the extent of the steam zone after 8 hours of injection at 3.4 bars injection pressure from an injection well (33) into a 5 darcie sand layer (34) with impermeable sediments on either side. The area (35) where liquid water saturation is below 1 indicates the presence of steam. Saturated steam with 100 ppm gas (by weight) is injected.

At this point in the simulation, injection is stopped and the steam zone allowed to collapse until no steam is present (all the heated zone is liquid filled again). The distribution of temperature at 24 hours is shown in FIG. 3B; the heated zone (36) is slightly larger than the original zone containing live steam. The collapse of cold water back into that zone did not noticeably shrink the zone, since the heat capacity of the soil is so much greater than that of the small amount of water flowing through it. The temperature decreases to the boiling point of water at the applied pressure.

FIG. 3C shows the extent (37) of gas-saturated water at this point, assuming that 100 ppm (by weight) of oxygen or air was injected along with the stream. The gas is fully distributed in the heated "reaction" zone, as well as in the area beyond the extent of the original steam zone where cold, condensed steam which is oxygen saturated was located. The heated area (36) in FIG. 3B overlaps with most of the gas-enriched area (37); this is the reaction zone where the oxidation or reduction of metals will be rapid due to the high temperatures (the boiling point at the applied pressure in this simulation, 150° C. and the water saturated with the reactive gas. The reaction occurs mainly in the collapsed steam zone; thus, a huff-huff and puff operation is indicated where each additional injection of steam builds a slightly larger reaction zone.

The ability to mix the gas with or add the chelating compound to the native water is key to this invention's practicality. Other methods for adding chemical reactants to soil or groundwater do not have good mixing methods, and the fluid used to inject the chemical ends up simply displacing the contaminated water. Further, this invention produces a fully-mixed reaction zone which is very hot, greatly speeding the oxidation/reduction reactions which are key to the metal immobilization part of the invention.

While specific sequences of operation, materials, pressures, time periods, etc. have been set forth to exemplify and explain the principles of the invention, such are not intended to be limiting. Modifications and changes may become apparent to those skilled in the art, and it is intended that the invention be limited only by the scope of the appended claims.

The invention claimed is:

1. A method for in situ decontamination of a subsurface area containing mixed-waste, comprising:

providing a quantity of steam;

chemically tailoring the steam with an additive to form a steam-additive mixture;

pressuring the steam-additive mixture;

injecting the pressurized steam-additive mixture underground and adjacent an area containing the mixed-waste;

directing the pressurized steam-additive mixture through a subsurface area containing the mixed-waste;

providing a subatmospheric extraction means located in spaced relation to the injected steam-additive mixture;

whereby the steam-additive mixture mobilizes at least one of the components in the mixed-waste and such is passed through the subsurface area toward the subatmospheric extraction means for withdrawal from the area containing the mixed-waste.

2. The method of claim 1, wherein the additive mixed with the steam is an additive which has the capability to mobilize at least organic and metallic components of the mixed-waste.

3. The method of claim 2, wherein the mobilization of the metallic component is carried out by solubilizing the metallic component.

4. The method of claim 3, wherein solubilizing the metallic component is carried out by changing oxidation state of the metallic component by changing the Eh or pH of the steam additive mixture.

5. The method of claim 1, wherein the additive mixed with the steam is an additive which has the capability to at least mobilize an organic component of the mixed-waste, and immobilize at least a metallic component of the mixed-waste.

6. The method of claim 5, wherein the immobilization of the metallic component is carried out by precipitation of the metallic component in clusters large enough to limit future migration thereof.

7. The method of claim 1, wherein the additive is a metallic or radionuclide mobilizing additive selected from the group consisting of crown ethers, carboxylic acids, halides and amides and citrate.

8. The method of claim 1, wherein the additive is a gas.

9. The method of claim 8, wherein the gas is an oxidizing or reducing gas.

10. The method of claim 1, wherein the additive is a metallic immobilizing additive selected from the group consisting of $H_2$, CO, and $O_2$.

11. A method for in situ decontamination of a contaminated subsurface area containing mixed-waste including organics and metals or radionuclides, comprising:

providing an injection well system comprising at least one injection well located within the contaminated area;

providing at least one extraction well located within the contaminated area and spaced from the at least one injection well;

chemically tailoring the steam with an additive;

concurrently injecting the steam-additive into the injection well system and applying subatmospheric pressure to the extraction well, whereby the steam-additive is pushed and drawn in a substantially horizontal direction through the contaminated subsurface area toward the extraction well and whereby said steam-additive causes mobilization of at least an organic component of the mixed-waste and causes either mobilization or immobilization of at least a metallic or radionuclide component of the mixed-waste;

withdrawing through the extraction well at least the mobilized contaminants; and ceasing injection of the steam-additive into the injection well system.

12. The method of claim 11, additionally including continuing the application of subatmospheric pressure at the extraction well to withdraw residual steam, water, and mobilized contaminants from the subsurface area.

13. The method of claim 11, additionally providing a plurality of injection wells proximate to the periphery of and/or within said contaminated area.

14. The method of claim 11, additionally including forming the additive to enable mobilization of any organic component in the mixed waste.

15. The method of claim 14, additionally including forming the additive to also enable mobilization of any metal or radionuclide component in the mixed waste.

16. The method of claim 15, wherein mobilization of any metal component in the mixed waste is carried out by solubilizing the metal component.

17. The method of claim 16, wherein solubilizing the metal component is carried out by changing oxidation state of the metal.

18. The method of claim 14, additionally including forming the additive to also enable immobilization of any metal or radionuclide component in the mixed waste.

19. The method of claim 18, wherein immobilization of any metal component in the mixed waste is carried out by precipitation of the metal into clusters.

20. The method of claim 11, wherein the additive is selected from an oxidizing gas and a reducing gas.

* * * * *